(12) United States Patent
Yonezawa

(10) Patent No.: US 12,198,417 B2
(45) Date of Patent: Jan. 14, 2025

(54) IMAGE MANAGEMENT DEVICE, CONTROL METHOD, AND STORAGE MEDIUM

(71) Applicant: NEC Corporation, Tokyo (JP)

(72) Inventor: Yaeko Yonezawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/766,866

(22) PCT Filed: Sep. 2, 2020

(86) PCT No.: PCT/JP2020/033316
§ 371 (c)(1),
(2) Date: Apr. 6, 2022

(87) PCT Pub. No.: WO2021/084898
PCT Pub. Date: May 6, 2021

(65) Prior Publication Data
US 2024/0087307 A1    Mar. 14, 2024

(30) Foreign Application Priority Data

Oct. 30, 2019 (JP) .................................. 2019-197069

(51) Int. Cl.
*G06V 10/96* (2022.01)
*G06V 10/74* (2022.01)
*G06V 10/75* (2022.01)

(52) U.S. Cl.
CPC ............ *G06V 10/96* (2022.01); *G06V 10/751* (2022.01); *G06V 10/761* (2022.01)

(58) Field of Classification Search
CPC ..... G06V 10/751; G06V 10/761; G06V 10/96
See application file for complete search history.

(56) References Cited

U.S. PATENT DOCUMENTS

2012/0013436 A1   1/2012   Niinuma
2017/0278056 A1   9/2017   Itou et al.

FOREIGN PATENT DOCUMENTS

| JP | 2004-127157 A | 4/2004 |
| JP | 2007-299187 A | 11/2007 |
| JP | 2018-182624 A | 11/2018 |
| WO | 2010/116470 A1 | 10/2010 |
| WO | 2016/052383 A1 | 4/2016 |

OTHER PUBLICATIONS

International Search Report for PCT Application No. PCT/JP2020/033316, mailed on Nov. 10, 2020.

*Primary Examiner* — Sam Bhattacharya

(57) ABSTRACT

An image management apparatus (2000) acquires a target image (10) acquired by capturing an image of a target object (12). The image management apparatus (2000) determines, from among master information (20), a master image (24) whose degree of similarity to the target image (10) is high. The image management apparatus (2000) compares suitability as a master image between the target image (10) and the determined master image (24) (a similar master image), and updates the master information (20), based on a comparison result. Specifically, the image management apparatus (2000) adds the target image (10) to the master information (20) as a master image when the target image (10) has higher suitability. Further, in this case, the image management apparatus (2000) deletes the similar master image from the master information (20), or assigns, to the target image (10), a higher degree of priority than a degree of priority assigned to the similar master image.

11 Claims, 6 Drawing Sheets

IMAGE MANAGEMENT DEVICE, CONTROL METHOD, AND STORAGE MEDIUM

This application is a National Stage Entry of PCT/JP2020/033316 filed on Sep. 2, 2020, which claims priority from Japanese Patent Application 2019-197069 filed on Oct. 30, 2019, the contents of all of which are incorporated herein by reference, in their entirety.

TECHNICAL FIELD

The present invention relates to management of an image being used for object recognition.

BACKGROUND ART

A technique for recognizing a specific object from a captured image has been developed. For example, PTL 1 discloses a technique for recognizing a product and a price tag from a captured image capturing a display location.

Herein, an image of a specific object (hereinafter, a master image) is used as information for recognizing the object from a captured image. PTL 2 describes generating, from an image including an object, a master image being used for detecting the object.

RELATED DOCUMENT

Patent Document

[PTL 1] International Patent Publication No. WO2016/052383
[PTL 2] Japanese Patent Application Publication No. 2004-127157

SUMMARY OF THE INVENTION

Technical Problem

In order to increase recognition accuracy of an object in image processing, it is preferable to prepare a plurality of master images for one object. For example, when an appearance of an object is different depending on a viewing angle, a master image is prepared for each of the plurality of angles.

However, simply preparing a large number of master images requires a lot of time to compare an object included in a captured image with the master image, and efficiency of object recognition decreases.

The present invention has been made in view of the above problem, and one of objects of the invention is to provide a technique for appropriately managing a master image being used for object recognition.

Solution to Problem

An image management apparatus according to the present invention includes: 1) an acquisition unit that acquires a target image acquired by capturing an image of a target object; 2) a determination unit that determines, from among master information including one or more master images, a master image having a high degree of similarity to the target image; and 3) an update unit that compares suitability as a master image between the target image and the determined master image, and updates the master information, based on a comparison result.

When the target image has the higher suitability than the determined master image, the update unit 1) adds the target image, as a master image, to the master information, and 2) deletes the determined master image from the master information, or assigns, to the target image, a higher degree of priority than a degree of priority assigned to the determined master image.

A control method according to the present invention is executed by a computer. The control method includes: 1) an acquisition step of acquiring a target image acquired by capturing an image of a target object; 2) a determination step of determining, from among master information including one or more master images, a master image having a high degree of similarity to the target image; and 3) an update step of comparing suitability as a master image between the target image and the determined master image, and updating the master information, based on a comparison result.

In the update step, when the target image has the higher suitability than the determined master image, 1) the target image is added, as a master image, to the master information, and 2) the determined master image is deleted from the master information, or a higher degree of priority than a degree of priority assigned to the determined master image is assigned to the target image.

A program of the present invention causes a computer to execute each step of the control method according to the present invention.

Advantageous Effects of Invention

According to the present invention, a technique for appropriately managing a master image being used for object recognition is provided.

DESCRIPTION OF EMBODIMENTS

The following will describe an example embodiment of the present invention with reference to the drawings. Note that, in all the drawings, a similar component is designated by a similar reference sign, and description thereof will be omitted as appropriate. Further, unless otherwise specified, in each block diagram, each block represents a functional unit component, not a hardware unit component. In the following description, unless otherwise specified, various predetermined values (a threshold value and the like) are stored in advance in a storage apparatus accessible from a functional component unit that uses the values.

First Example Embodiment

<Overview>

Figure 1:
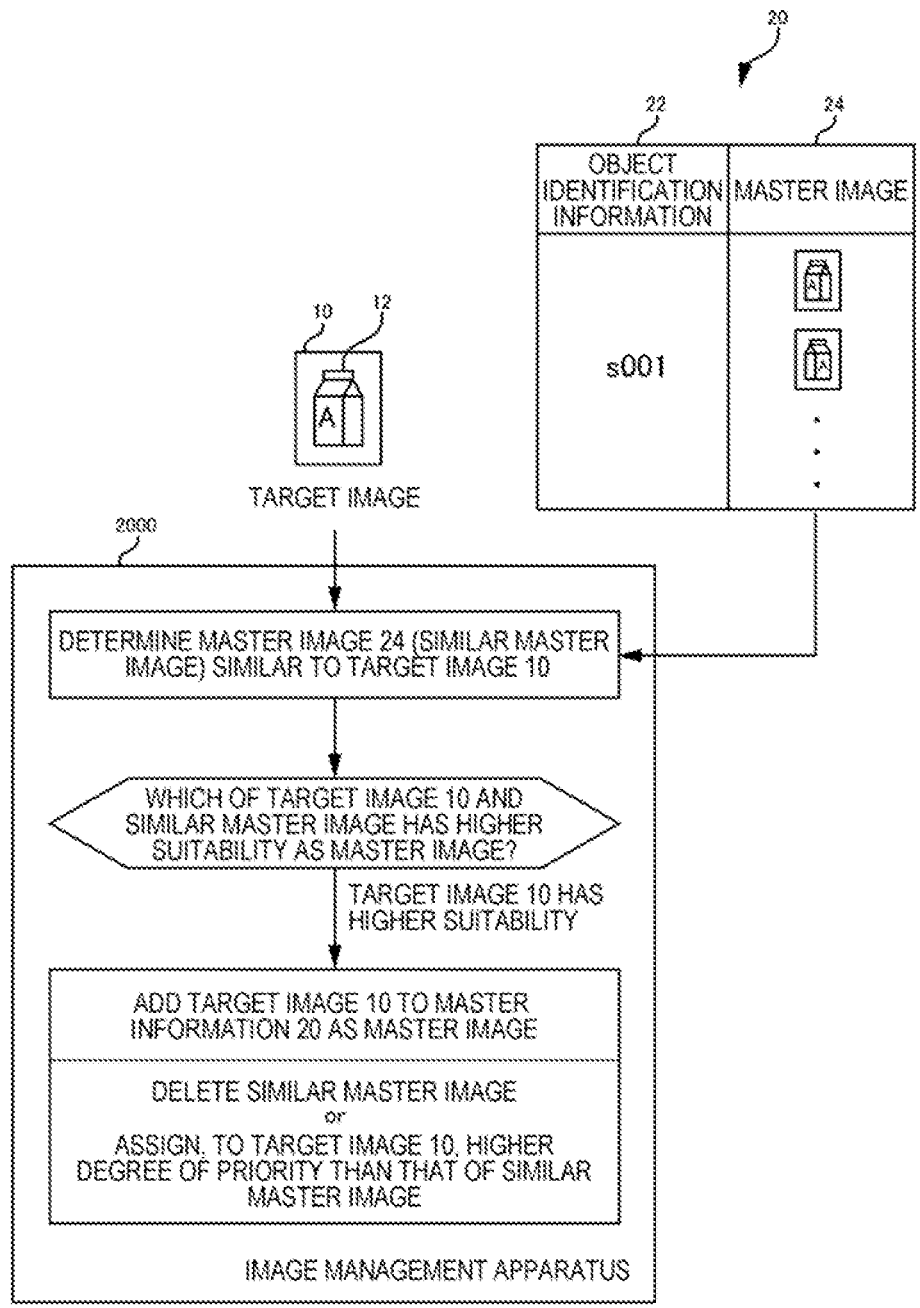
FIG. 1 is a diagram conceptually illustrating an operation of an image management apparatus according to a first example embodiment.

FIG. 1 is a diagram conceptually illustrating an operation of an image management apparatus 2000 according to a first example embodiment. Herein, the operation of the image management apparatus 2000 described with reference to FIG. 1 is an example for facilitating understanding of the image management apparatus 2000, and does not limit the operation of the image management apparatus 2000. Details and variations of the operation of the image management apparatus 2000 will be described later.

The image management apparatus 2000 manages master information 20. The master information 20 is used for object recognition processing by image processing. The object recognition processing herein refers to processing of determining an object included in an image. For example, in a situation where identification information is given to each known object in advance, the object recognition processing determines identification information of an object included in an image.

The master information 20 associates object identification information 22 with a master image 24. The object identification information 22 is identification information of an object, and the master image 24 is an image of an object determined by the identification information. The number of master images 24 associated with the object identification information 22 may be one or plurality. In the object recognition processing, a piece of master information 20 indicating a master image 24 having a high degree of similarity to an image of a recognition target object is determined from a plurality of pieces of master information 20. Then, the object identification information 22 indicated by the master information 20 determined herein is determined as identification information of the recognition target object.

The image management apparatus 2000 performs processing of registering a new master image in the master information 20. To do so, first, the image management apparatus 2000 acquires a target image 10 being a candidate of an image to be added to the master information 20. The target image 10 is an image including a target object 12.

The image management apparatus 2000 determines, from among the master images 24 indicated by the master information 20 regarding the target object 12, a master image 24 whose degree of similarity to the target image 10 is equal to or more than a threshold value. Hereinafter, the master image 24 determined herein is referred to as a similar master image.

The image management apparatus 2000 determines which of the similar master image and the target image 10 has higher suitability as a master image. "Higher suitability as a master image" herein means that suitability as a master image being used for object recognition processing is higher. For example, an image having a higher resolution, an image having more keypoints being detected, or the like is handled as an image that has higher suitability as a master image.

When it is determined that the target image 10 has higher suitability as a master image, the image management apparatus 2000 updates the master information 20. Specifically, the image management apparatus 2000 adds the target image 10, as a new master image 24, to the master information 20. Furthermore, the image management apparatus 2000 1) deletes the similar master image from the master information 20, or 2) assigns, to the target image 10, a higher degree of priority than a degree of priority assigned to the similar master image.

In a case of 1), when the target image 10 has higher suitability as a master image, the similar master image is deleted from the master information 20, while the target image 10 is registered, as the master image 24, in the master information 20. Thus, the master information 20 includes only an image having higher suitability as a master image from among the target image 10 and the similar master image. In this way, it is possible to efficiently perform object recognition processing using the master information 20. Further, since this allows to suppress an excessive number of master images, it is also possible to reduce a capacity of a storage apparatus for storing the master information 20.

In a case of 2), it is premised that a degree of priority is assigned to each master image 24 in the master information 20. The degree of priority represents a degree of priority of usage in object recognition processing. That is, a master image 24 assigned with a higher degree of priority is used more preferentially in the object recognition processing that uses the master image 24. Thus, when it is determined that the target image 10 has higher suitability as a master image, the image management apparatus 2000 causes the target image 10 to be preferentially used than the similar master image in the object recognition processing, while the image management apparatus 2000 registers the target image 10 as a new master image 24. In this way, it is possible to efficiently perform the object recognition processing using the master information 20.

The following will describe the image management apparatus 2000 in more detail.

<Example of Functional Configuration>

Figure 2:
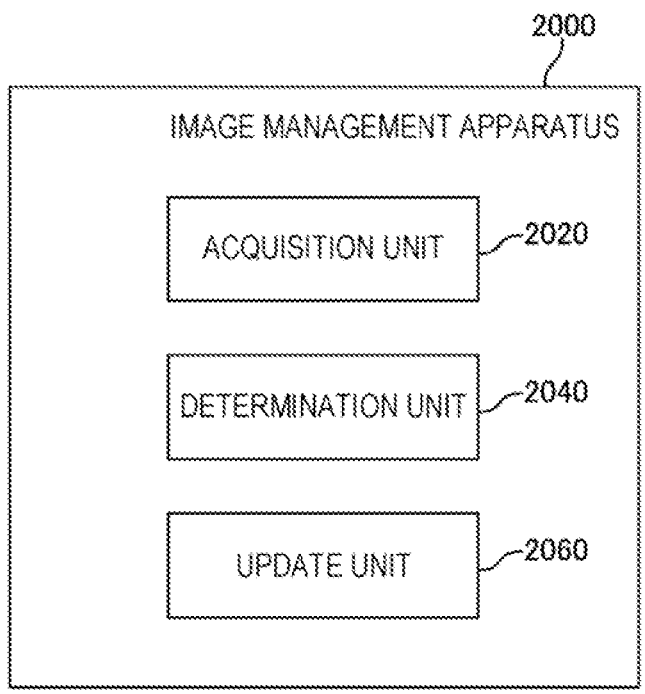
FIG. 2 is a diagram illustrating a functional configuration of the image management apparatus.

FIG. 2 is a diagram illustrating a functional configuration of the image management apparatus 2000. The image management apparatus 2000 includes an acquisition unit 2020, a determination unit 2040, and an update unit 2060. The acquisition unit 2020 acquires a target image 10. The determination unit 2040 determines a master image 24 (a similar master image) whose degree of similarity to the target image 10 is equal to or more than a threshold value from among master images 24 included in master information 20. The update unit 2060 determines which of the similar master image and the target image 10 has higher suitability as a master image. The update unit 2060 updates the master information 20.

When it is determined that the target image 10 has higher suitability as a master image than the similar master image, the update unit 2060 adds the target image 10, as the master image 24, to the master information 20, and performs 1) processing of deleting the similar master image from the master information 20, or 2) processing of assigning, to the target image 10, a higher degree of priority than a degree of priority assigned to the similar master image.

<Example of Hardware Configuration of Image Management Apparatus 2000>

Each functional component unit of the image management apparatus 2000 may be achieved by hardware (example: a hard-wired electronic circuit, and the like) that achieves each functional component unit, or may be achieved by a combination of hardware and software (example: a combination of an electronic circuit and a program that controls the electronic circuit, and the like). The following will further describe a case where each functional component unit of the image management apparatus 2000 is achieved by a combination of hardware and software.

Figure 3:
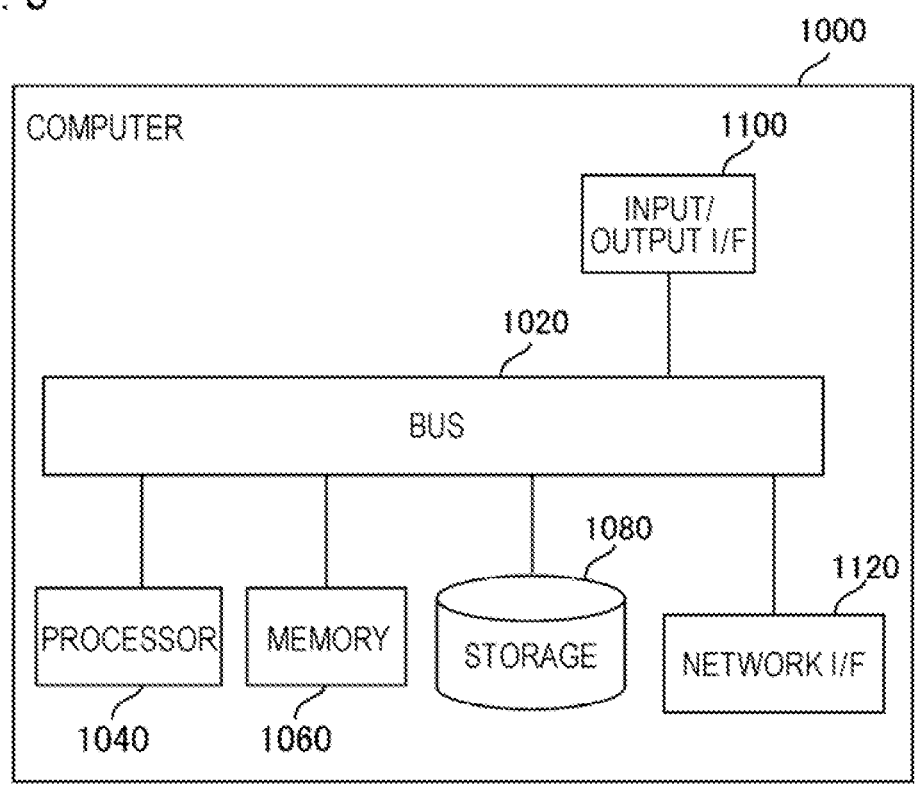
FIG. 3 is a diagram illustrating a computer for achieving the image management apparatus.

FIG. 3 is a diagram illustrating a computer 1000 for achieving the image management apparatus 2000. The computer 1000 is any computer. For example, the computer 1000 is a stationary computer such as a personal computer (PC) or a server machine. In addition, for example, the computer 1000 is a portable computer such as a smartphone or a tablet terminal.

The computer 1000 may be a dedicated computer designed in order to achieve the image management apparatus 2000, or may be a general-purpose computer. In the latter case, each function of the image management apparatus 2000 is achieved by the computer 1000, for example, by installing a predetermined application on the computer 1000. The above-described application is configured by a program for achieving the functional component unit of the image management apparatus 2000.

The computer 1000 includes a bus 1020, a processor 1040, a memory 1060, a storage device 1080, an input/output interface 1100, and a network interface 1120. The bus 1020 is a data transmission path that allows the processor 1040, the memory 1060, the storage device 1080, the input/output interface 1100, and the network interface 1120 to transmit and receive data to and from one another. However, a method of connecting the processor 1040 and the like to one another is not limited to bus connection.

The processor 1040 is various processors such as a central processing unit (CPU), a graphics processing unit (GPU), and a field-programmable gate array (FPGA). The memory 1060 is a main storage apparatus achieved by using a random access memory (RAM) or the like. The storage device 1080 is an auxiliary storage apparatus achieved by using a hard disk, a solid state drive (SSD), a memory card, a read only memory (ROM), or the like.

The input/output interface 1100 is an interface for connecting the computer 1000 and an input/output device. For example, an input apparatus such as a keyboard and an output apparatus such as a display apparatus are connected to the input/output interface 1100.

The network interface 1120 is an interface for connecting the computer 1000 to a communication network. The communication network is, for example, a local area network (LAN) or a wide area network (WAN).

The storage device 1080 stores a program (a program that achieves the above-described application) that achieves each functional component unit of the image management apparatus 2000. The processor 1040 achieves each functional component unit of the image management apparatus 2000 by reading this program into the memory 1060 and executing the program.

<Flow of Processing>

Figure 4:
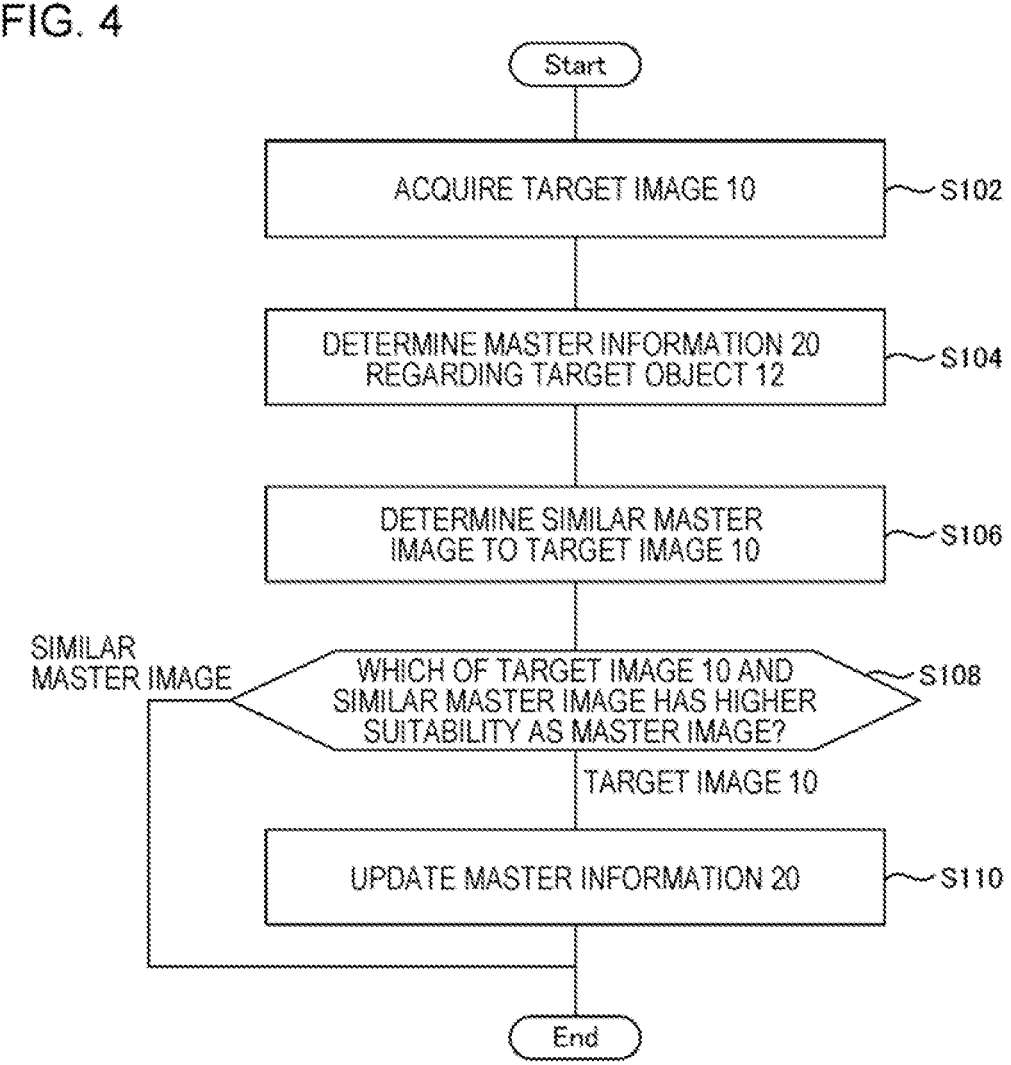
FIG. 4 is a flowchart illustrating a flow of processing executed by the image management apparatus of the first example embodiment.

FIG. 4 is a flowchart illustrating a flow of processing executed by the image management apparatus 2000 of the first example embodiment. The acquisition unit 2020 acquires a target image 10 (S102). The determination unit 2040 determines master information 20 regarding a target object 12. The determination unit 2040 determines a master image 24 (a similar master image) whose degree of similarity to the target image 10 is equal to or more than a threshold value from among master images 24 included in the master information 20 (S106). The update unit 2060 determines which of the similar master image and the target image 10 has higher suitability as a master image (S108).

When it is determined that the target image 10 has higher suitability as a master image (S108: target image 10), the update unit 2060 updates the master information 20 (S110).

Processing executed by the image management apparatus 2000 is not limited to the processing illustrated in FIG. 4. For example, the update unit 2060 may add the target image 10, as a master image, to the master information 20 even when it is determined that the similar master image has higher suitability as a master image than the target image 10 (S108: similar master image). However, in this case, the update unit 2060 sets the target image 10 to have a lower degree of priority than a degree of priority of the similar master image.

<Regarding Target Image 10>

The target image 10 is an image of an object acquired as a result of capturing an image by a camera. For example, a user of the image management apparatus 2000 acquires a target image 10 by capturing an image of a target object with a camera provided in a mobile terminal. For example, when an object is a product, an image including the product can be acquired by capturing an image of a display location where the product is placed. Note that, the target image 10 is not limited to an image generated by a camera, and may be an image that has been subjected to various processing (size change, color tone correction, and the like) after being generated by a camera.

Herein, the target image 10 is an image including only one object (for example, an image of a circumscribed rectangle and inside of an object). On the other hand, a captured image acquired by capturing an image of an object with a camera may include a plurality of objects, or may include one object and background thereof widely. For example, as described above, when an image of a display location of a product is captured, it is considered that the captured image acquired from a camera often includes a plurality of products. Thus, the target image 10 is generated by extracting an image region of one object from the captured image. In other words, processing of extracting the target image 10 from the captured image is performed.

Extraction of the target image 10 may be performed by a user using an image editing application or the like, or may be automatically performed by an apparatus (hereinafter, an object detection apparatus). In the latter case, the object detection apparatus acquires a captured image, and performs processing (object detection processing) of detecting an image region representing an object on the captured image. As a result, an image region (an object region) representing an object is detected from the captured image. The object detection apparatus outputs the image region representing the detected object as the target image 10.

Any method is used as a method by which the object detection apparatus acquires a captured image. For example, the object detection apparatus acquires a captured image transmitted from a terminal operated by a user (hereinafter, a user terminal). In addition, for example, a user may input a captured image to the object detection apparatus by directly operating the object detection apparatus.

Note that, a computer that achieves the object detection apparatus may be the same as or different from the computer that achieves the image management apparatus 2000. The former case is equivalent to providing the image management apparatus 2000 with a function of extracting a target image 10 from a captured image.

<Acquisition of Target Image 10: S102>

The acquisition unit 2020 acquires a target image 10 (S102). Any method is used as a method by which the acquisition unit 2020 acquires the target image 10. For example, it is assumed that the image management apparatus 2000 performs a series of processing according to direct operation by a user. In this case, the acquisition unit 2020 accepts a user operation of inputting the target image 10. At this time, the acquisition unit 2020 may further accept an input for specifying identification information of the target object 12.

In addition, for example, it is assumed that the image management apparatus 2000 receives a request from a user terminal and performs a series of processing according to the request. In this case, for example, the acquisition unit 2020 receives a request including the target image 10 from the user terminal, and acquires the target image 10 included in the request. Note that, at this time, the request may further indicate the identification information of the target object 12.

In addition, for example, as described above, it is assumed that the target image 10 is extracted from the captured image by the object detection apparatus. In this case, the acquisition unit 2020 acquires the target image 10 extracted by the object detection apparatus. At this time, the acquisition unit 2020 may acquire only a part of the target image 10 instead of the whole target image 10 extracted by the object detection apparatus.

For example, the acquisition unit 2020 acquires only the target image 10 being specified by a user from among the target image 10 extracted by the object detection apparatus. In this case, for example, the object detection apparatus outputs a detected object region in a visible manner, and causes a user to select an object region. For example, the object detection apparatus outputs, to a user terminal, a captured image in which a frame or the like is attached to each object region. A user specifies one or more object regions to be intended to use as the target image 10 by operating the user terminal. The object detection apparatus outputs the object region specified by the user as the target image 10.

Herein, the object detection apparatus may further perform recognition of an object (determination of identification information of an object) in addition to detecting the object. In this case, the acquisition unit 2020 acquires a combination of the target image 10 and the identification information of the target object 12 from the object detection apparatus.

<Determination of Master Information 20 Regarding Target Object 12: S104>

The determination unit 2040 determines master information 20 regarding the target object 12 (S104). When the identification information of the target object 12 is acquired together with the target image 10, the determination unit 2040 determines the master information 20 indicating the acquired identification information of the target object 12 as the master information 20 regarding the target object 12.

On the other hand, when the identification information of the target object 12 is not acquired, the determination unit 2040 determines the identification information of the target object 12 by performing object recognition processing on the target image 10. Then, the determination unit 2040 determines the master information 20 indicating the determined identification information of the target object 12 as the master information 20 regarding the target object 12.

However, instead of performing the object recognition processing by itself, the determination unit 2040 may request another apparatus (for example, the above-mentioned object detection apparatus) to perform the object recognition processing and acquire the processing result (i.e., the identification information of the target object 12).

Herein, when the identification information of the target object 12 is determined by the object recognition processing, the determination result may be presented to a user in such a way as to cause the user to check whether there is an error. In this way, it is possible to prevent occurrence of an error in association between the identification information and the master image in a configuration in which an apparatus automatically recognizes the target object 12. Note that, when there is an error in the recognition result, a user is allowed to manually input the identification information of the target object 12. Then, the determination unit 2040 determines, as the master information 20 regarding the target object 12, the master information 20 that indicates the identification information input by a user as the object identification information 22.

<Determination of Similar Master Image: S106>

The determination unit 2040 determines a master image 24 that has a high degree of similarity to the target image 10 from among the master images 24 included in the master information 20 regarding the target object 12 (S106). The master image 24 determined herein is handled as a similar master image.

For example, the determination unit 2040 computes a degree of similarity between the target image 10 and the master image 24 for each master image 24 included in the master information 20 regarding the target object 12, and determines whether the computed degree of similarity is equal to or more than a threshold value. When a degree of similarity between a certain master image 24 and the target image 10 is equal to or more than the threshold value, the determination unit 2040 determines the master image 24 as the master image 24 having a high degree of similarity to the target image 10.

Figure 5:
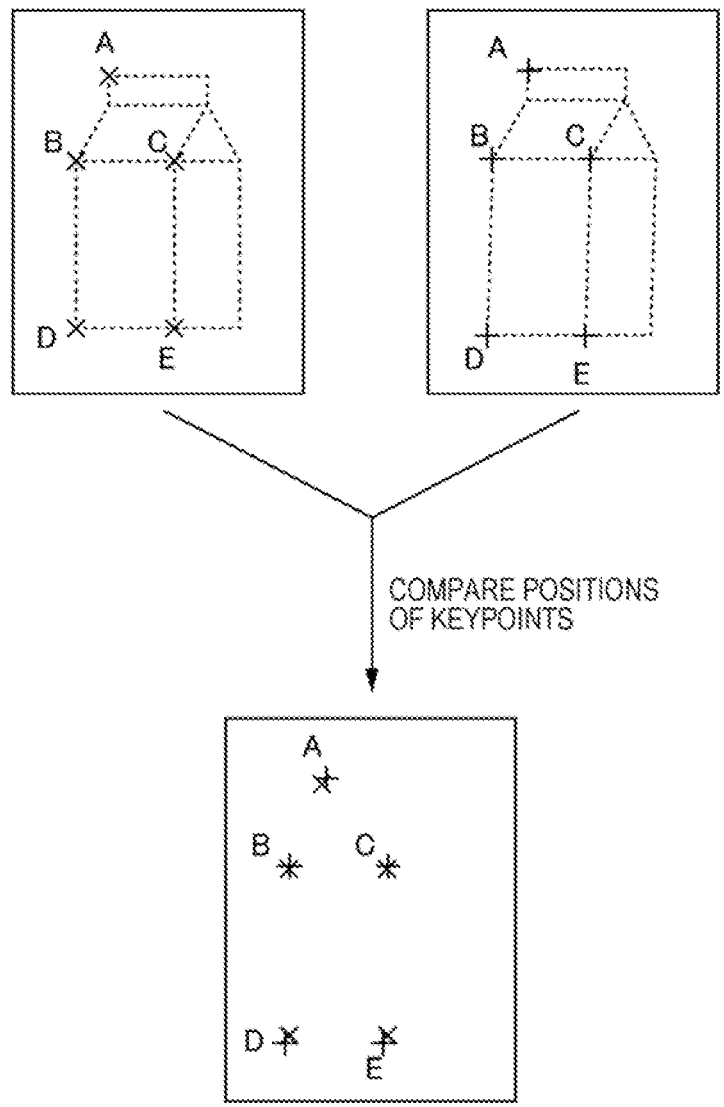
FIG. 5 illustrates a case where a degree of similarity between a target image and a master image is high.
Figure 6:
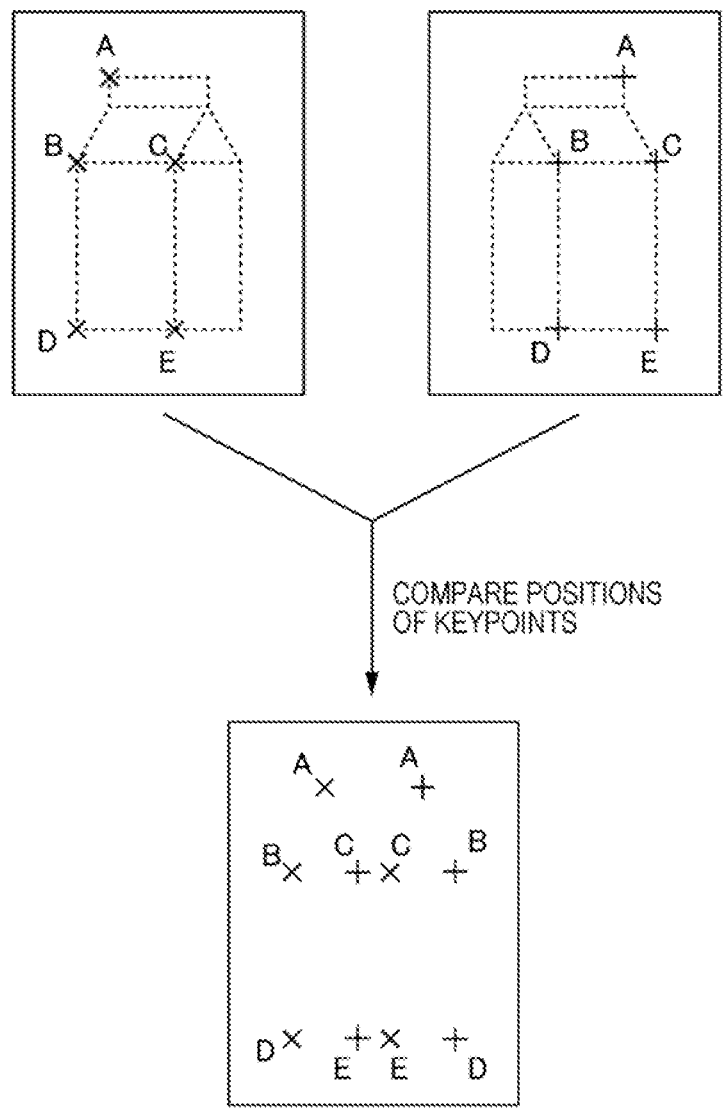
FIG. 6 illustrates a case where a degree of similarity between a target image and a master image is low.

Various indexes can be used as an index of a degree of similarity between the target image 10 and the master image 24. For example, the determination unit 2040 determines a matching keypoint between the target image 10 and the master image 24, and determines the degree of similarity between the target image 10 and the master image 24, based on a difference in a position of the matching keypoint. FIGS. 5 and 6 are diagrams for illustrating a degree of similarity based on a difference in a position of a keypoint. FIG. 5 illustrates a case where a degree of similarity between the target image 10 and the master image 24 is high. On the other hand, FIG. 6 illustrates a case where a degree of similarity between the target image 10 and the master image 24 is low. Note that, in order to improve visibility of the drawings, an object is expressed by a dotted line in FIGS. 5 and 6.

In FIGS. 5 and 6, keypoints A to E are detected from the target image 10. Keypoints A to E are also detected from the master image 24. The keypoints with the same symbol in the target image 10 and the master image 24 represent the same keypoints. For example, the keypoint A detected from the target image 10 and the keypoint A detected from the master image 24 represent the same keypoints. Note that, an existing technique can be used as a technique for detecting the same keypoints in two different images.

The determination unit 2040 computes a difference in position between the keypoint A in the target image 10 and the keypoint A in the master image 24. For example, the determination unit 2040 computes a distance between coordinates of the keypoint A in the target image 10 and coordinates of the keypoint A in the master image 24, as a value representing a difference between these positions. It can be said that the longer the distance between the same keypoints, the larger the difference in position of the same keypoints. Note that, when the sizes of the target image 10 and the master image 24 are different, it is preferable to enlarge or reduce one or both of the images in such a way as to match these sizes, and then compute the distance.

The determination unit 2040 also computes a difference in position between other matching keypoints, and computes the degree of similarity between the target image 10 and the master image 24, based on the computed difference in position. For example, the degree of similarity is computed based on the following equation (1).

[Mathematical 1]

$$s = 1/\sum_{i=1}^{m} D_i \quad (1)$$

where s represents a degree of similarity. Di represents a difference in position of a keypoint i detected in each of the target image 10 and the master image 24. m represents the number of matching keypoints between the target image 10 and the master image 24. According to the equation (1), the smaller a sum of differences in position, the higher the degree of similarity s.

In FIG. 5, the same keypoints are located close to each other in the target image 10 and the master image 24. Thus, in the equation (1), a total sum of differences in position becomes small, and the degree of similarity s becomes large. On the other hand, in FIG. 6, keypoints C and keypoints E are close to each other to some extent, but the other keypoints are away from each other. Thus, in the equation (1), the total sum of differences in position becomes large, and the degree of similarity s becomes small.

Note that, in addition to the difference in position between the matching keypoints, the number of matching keypoints may be further taken into account. For example, as indicated by the following equation (2), a value computed by the equation (1) is multiplied by a value f(m) that increases as the number of matching keypoints increases. As a result, the higher the number of matching keypoints, the higher the degree of similarity. Any monotonic non-decreasing function can be used as a function f( )

[Mathematical 2]

$$s = f(m)/\sum_{i=1}^{m} D_i \quad (2)$$

Note that, the master information 20 may further indicate information (coordinates of a keypoint, a feature value of the keypoint, and the like) on each keypoint detected from the master image 24, for each master image 24. In this case, the determination unit 2040 can recognize the keypoint of each master image 24 by referring to the master information 20.

In addition, for example, the determination unit 2040 may use the same method for computing a degree of similarity between an image of an object to be recognized in the object recognition processing and a master image in order to compute the degree of similarity between the target image 10 and the master image 24.

Computation of a degree of similarity may be performed by using a machine learning technique. Specifically, an estimation model for estimating a degree of similarity between two images according to an input of the two images is provided. The estimation model is learned in advance using a plurality of pieces of learning data being configured by a combination of "two images and a degree of similarity therebetween. Various types of estimation models such as a neural network and a support vector machine (SVM) can be used. The determination unit 2040 can acquire the degree of similarity between the target image 10 and the master image 24 by inputting the target image 10 and the master image 24 into the estimation model.

In addition, for example, a determination model for determining whether a degree of similarity between two images is high, according to the input of these images, may be provided. The determination model is learned in advance using a plurality of pieces of learning data being configured by a combination of "two images and output of a correct answer (information indicating whether these images are similar)". As a type of the determination model, various types can be used as in the case of the type of the estimation model.

The determination unit 2040 inputs the target image 10 and the master image 24 into the determination model. Then, when the determination model determines that the degree of similarity between these images is high, the determination unit 2040 determines the input master image 24 as a master image 24 having a high degree of similarity to the target image 10.

Herein, it is conceivable that there are a plurality of master images 24 having a high degree of similarity to the target image 10. In this case, the determination unit 2040 may handle only one of the plurality of master images 24 as a similar master image, or handle each of the plurality of master images 24 as a similar master image.

In the former case, for example, the determination unit 2040 handles the master image 24 having the highest degree of similarity to the target image 10 and the master image 24 having the lowest suitability index value, as described later, as a similar master image. On the other hand, in the latter case, for example, the determination unit 2040 sequentially handles the master image 24 one by one, as a similar master image, from the master image 24 having the highest degree of similarity to the target image 10 in such a way that subsequent processing can be performed.

Herein, in the master information 20, the master images 24 may be classified into a plurality of groups. For example, the master images 24 are classified according to an orientation of an object included in the master image 24 (upward, rightward, downward, leftward, or the like in a plan view). In this case, the determination unit 2040 may determine a group to which the target image 10 belongs, and may use only the master image 24 included in the group to compare with the target image 10. For example, when the target object 12 is oriented rightward, the determination unit 2040 determines an image having a high degree of similarity to the target image 10 from among the master images 24 included in the rightward-oriented group. Note that, an existing technique can be used as a technique for determining an orientation of an object included in an image.

Note that, grouping of the master image 24 is not limited to the orientation-based group. For example, when an object is a person, it is conceivable to group the master images 24 in the master information 20 on the same person according to presence or absence of possession, such as a case where glasses are worn or not worn, and a case where a hat is worn or not worn.

<Comparison of Suitability as Master Image: S108>

The update unit 2060 determines which of the target image 10 and the similar master image has higher suitability as a master image (S108). To do so, for example, the update unit 2060 computes a value of an index (suitability index) indicating a height of suitability as a master image for each of the target image 10 and the similar master image, and compares the suitability index values. When a suitability index value of the target image 10 is greater than a suitability index value of the similar master image, the update unit 2060 determines that the target image 10 has higher suitability as a master image. On the other hand, when the suitability index value of the target image 10 is equal to or less than the suitability index value of the similar master image, the update unit 2060 determines that the similar master image has higher suitability as a master image.

Various indexes can be adopted as the suitability index. For example, the suitability index is a height of resolution. For example, the higher the resolution, the higher the suitability index value. In this case, resolution of an image can be used as it is as the suitability index value of the image, or the suitability index value can be computed by using a function that converts the resolution into the suitability index value. As the above-described function, for example, any monotonic non-decreasing function can be used. In addition, a conversion table that associates a plurality of numerical ranges of resolution with the suitability index value of an image having resolution belonging to the numerical range may be prepared, and the resolution may be converted into a suitability index value using the conversion table.

However, there may be a case where the height of resolution required for a master image is fixed and a master image with the resolution higher than the required resolution is rather unfavorable. Thus, for example, the suitability index value based on the resolution may be a value that "increases with the increase in resolution until the resolution reaches a specific value, and decreases when the resolution is higher than the specific value." In this case, as a function for converting resolution to a suitability index value, a convex function having the above specific value as a maximum value can be used. In this case, the above-described conversion table can also be used.

As another example of a suitability index, for example, the number of keypoints can be used. That is, the larger the number of keypoints of an image, the higher the suitability index value. In this case, the number of keypoints acquired from an image can be used as it is as the suitability index value of the image, or the suitability index value can be computed by using a function that converts the number of keypoints into the suitability index value. As the above-described function, for example, any monotonic non-decreasing function can be used. In addition, a conversion table that associates a plurality of numerical ranges of the number of keypoints with the suitability index value of an image having the number of keypoints belonging to the numerical range may be prepared, and the number of keypoints may be converted to a suitability index value using the conversion table.

Computation of a suitability index value may be achieved by using a machine learning technique. For example, an estimation model for estimating a suitability index value of an image according to an input of the image is provided. The estimation model is learned in advance using a plurality of pieces of learning data represented by a combination of "an image and a suitability index value". As a type of the estimation model, various types of estimation models can be used as in the case of the type of the estimation model for estimating the above-described degree of similarity. The update unit 2060 can acquire a suitability index value for each of the target image 10 and the similar master image by inputting each of the target image 10 and the similar master image into the estimation model.

Herein, the master information 20 may further include a suitability index value of a master image 24 in association with the master image 24. In this case, the update unit 2060 can acquire the suitability index value of a similar master image from the master information 20. Note that, in this case, when the update unit 2060 adds the target image 10 to the master information 20 as a master image 24, it is preferable to add the suitability index value computed by the update unit 2060 together with the target image 10.

The update unit 2060 may not compute a suitability index value. For example, a determination model for determining which image has higher suitability as a master image according to an input of two images is provided. The determination model is learned in advance using a plurality of pieces of learning data that are combinations of "two images and output of a correct answer (information indicating which image has higher suitability as a master image)". As a type of the determination model, various types can be used as in the case of the type of the estimation model. The update unit 2060 can determine which of the target image 10 and the similar master image has higher suitability as a master image by inputting the target image 10 and the similar master image in the determination model.

<Updating Master Information 20: S110>

When it is determined that the target image 10 has higher suitability as a master image than the similar master image (S108: target image 10), the update unit 2060 updates the master information 20 that includes the similar master image (S110). The update unit 2060 at least adds the target image 10 to the master information 20 as one of the master images 24.

Furthermore, as described above, the update unit 2060 performs one of the following two pieces of processing.
1) Delete the similar master image
2) Assign, to the target image 10, a higher degree of priority than the similar master image Whether the update unit 2060 updates the master information 20 by 1) or 2) may be determined in advance, or may be selectable by a user.

Various methods can be considered for determining a degree of priority to be assigned to the target image 10. For example, the update unit 2060 uses the suitability index value described above as the degree of priority of the master image 24. In this way, the master image 24 having a higher degree of suitability as a master image has a higher degree of priority.

In addition, for example, a plurality of master images 24 included in the master information 20 regarding the target object 12 may be ranked according to a height of a degree of suitability as a master image, and an order may be used as the degree of priority. In this case, the higher the order, the higher the degree of priority. Hereinafter, the order being assigned according to the height of the degree of suitability as a master image is also referred to as an order of priority.

It is assumed that an order of priority of the similar master image is the highest in the master information 20. In this case, the update unit 2060 assigns the highest order of priority to the target image 10. On the other hand, when there is a master image 24 having a higher order of priority than the similar master image in the master information 20 regarding the target object 12, the update unit 2060 determines the order of priority of the target image 10 by comparing the suitability as the master image among the master image 24 having a higher order of priority than the similar master image and the target image 10. Processing of comparing the suitability as a master image can be achieved by using a function of the update unit 2060.

Herein, as described above, the master information 20 may grouped master images 24. In this case, a degree of priority of the master image 24 may be determined by a relative order in a group instead of in all the master images 24 included in the master information 20 regarding the target object 12. That is, the master image 24 is assigned with the order of priority within the group. Therefore, the update unit 2060 assigns, to the target object 12, the degree of priority represented by the order of priority in the group to which the target object 12 is added.

<<Case where an Upper Limit is Set on the Number of Master Images 24>>

An upper limit may be set on the number of master images 24 that can be included in the master information 20. In this case, the update unit 2060 performs processing of 2) when the number of master images 24 does not exceed an upper limit value, and processing of 1) when the number of master images 24 reaches the upper limit value.

Specifically, when the target image 10 is determined to have higher suitability as a master image, the update unit 2060 first determines whether the number of master images 24 included in the master information 20 is less than the upper limit value. When the number of master images 24 is less than the upper limit value, since the number of master images 24 is equal to or less than the upper limit value even when the target image 10 is added to the master information 20, the update unit 2060 does not delete the similar master image, assigns, to the target image 10, a degree of priority greater than the degree of priority of the similar master image, and adds the target image 10 to the master information 20. On the other hand, when the number of master images 24 is equal to more than the upper limit value, since the number of master images 24 exceeds the upper limit value when the target image 10 is added to the master information 20, the update unit 2060 deletes the similar master image from the master information 20 in such a way that the number of master images 24 does not exceed the upper limit value.

Note that, an upper limit value of the number of master images 24 may be set for each group described above. In this case, the update unit 2060 deletes the similar master image when the number of master images 24 included in the group exceeds the upper limit value by adding the target image 10 to the group. On the other hand, when the number of master images 24 included in the group does not exceed the upper limit value even when the target image 10 is added to the group, the update unit 2060 does not delete the similar master image, assigns, to the target image 10, a degree of priority greater than the degree of priority of the similar master image, and adds the target image 10 to the master information 20.

<Another Application Example of Master Information 20>

The master information 20 may be utilized for other purposes than object recognition processing. For example, when a product is handled as an object, the master image 24 included in the master information 20 may be used as an image of a product being referred to during a thought analysis of the product. In the thought analysis of a product, since an analysis about recognizing a user's needs from a characteristic of a product that a user likes to purchase is performed, an image of a product being easy to recognize the characteristic is required. In this regard, according to the image management apparatus 2000, an image of a product that has higher suitability as a master image 24 preferentially remains in the master information 20. As described above, an image that has higher suitability as a master image 24 can be said to be an image being easy to extract the characteristic of a product, such as having high resolution or having a large number of keypoints. Therefore, an image suitable for a thought analysis can be acquired from the master information 20 being managed by the image management apparatus 2000.

Some or all of the above example embodiments may also be described as in the following supplementary notes, but are not limited to the following.

1. An image management apparatus including:
    an acquisition unit that acquires a target image acquired by capturing an image of a target object;
    a determination unit that determines, from among master information including one or more master images, the master image having a high degree of similarity to the target image; and
    an update unit that compares suitability as a master image between the target image and the determined master image, and updates the master information, based on a comparison result, wherein,
    when the target image has the higher suitability than the determined master image, the update unit
        adds the target image to the master information as a master image, and
        deletes the determined master image from the master information, or assigns, to the target image, a higher degree of priority than a degree of priority assigned to the determined master image.

2. The image management apparatus according to supplementary note 1, wherein
    the update unit determines that the target image has the higher suitability when a number of keypoints included in the target image is greater than a number of keypoints included in the determined master image, or when resolution of the target image is higher than resolution of the determined master image.

3. The image management apparatus according to supplementary note 1 or 2, wherein
    the master information is used for object recognition processing for recognizing an object included in an image, and
    the master image assigned with a higher degree of priority is preferentially used in the object recognition processing.

4. The image management apparatus according to any one of supplementary notes 1 to 3, wherein
    the determination unit
        determines the master information indicating identification information of the target object, and
        determines, from among the master images included in the determined master information, the master image having a high degree of similarity to the acquired target image.

5. The image management apparatus according to any one of supplementary notes 1 to 4, wherein
    the determination unit computes a degree of similarity between the master image and the target image, based on a difference in position of same keypoints detected from the master image and the target image, and determines the master image whose degree of similarity is equal to or more than a threshold value as the master image having a high degree of similarity to the target image.

6 The image management apparatus according to any one of supplementary notes 1 to 5, wherein
    the update unit computes, for the target image, a suitability index value representing a height of suitability as a master image, and determines that, when a suitability index value of the target image is greater than a suitability index value of a master image determined by the determination unit, the target image has higher suitability.

7 A control method executed by a computer, including:
   an acquisition step of acquiring a target image acquired by capturing an image of a target object;
   a determination step of determining, from among master information including one or more master images, the master image having a high degree of similarity to the target image; and
   an update step of comparing suitability as a master image between the target image and the determined master image, and updating the master information, based on a comparison result, wherein,
   in the update step, when the target image has the higher suitability than the determined master image,
      adding the target image to the master information as a master image, and
      deleting the determined master image from the master information, or assigning, to the target image, a higher degree of priority than a degree of priority assigned to the determined master image.
8 The control method according to supplementary note 7, further including,
   in the update step, determining that the target image has the higher suitability when a number of keypoints included in the target image is greater than a number of keypoints included in the determines master image, or when resolution of the target image is higher than resolution of the determined master image.
9 The control method according to supplementary note 7 or 8, wherein
   the master information is used for object recognition processing for recognizing an object included in an image, and
   the master image assigned with a higher degree of priority is preferentially used in the object recognition processing.
10 The control method according to any one of supplementary notes 7 to 9, further including:
   in the determination step,
      determining the master information indicating identification information of the target object; and
      determining, from among the master images included in the determined master information, the master image having a high degree of similarity to the acquired target image.
11 The control method according to any one of supplementary notes 7 to 10, further including,
   in the determination step, computing a degree of similarity between the master image and the target image, based on a difference in position of same keypoints detected from the master image and the target image, and determining the master image whose degree of similarity is equal to or more than a threshold value as the master image having a high degree of similarity to the target image.
12 The control method according to any one of supplementary notes 7 to 11, further including,
   in the update step, computing, for the target image, a suitability index value representing a height of suitability as a master image, and determining that, when a suitability index value of the target image is greater than a suitability index value of a master image determined at the determination step, the target image has the higher suitability.
13 A program causing a computer to execute the control method according to any one of supplementary notes 7 to 12.

This application is based upon and claims the benefit of priority from Japanese patent application No. 2019-197069, filed on Oct. 30, 2019, the disclosure of which is incorporated herein in its entirety by reference.

REFERENCE SIGNS LIST

10 Target image
12 Target object
20 Master information
22 Object identification information
24 Master image
26 Degree of priority
1000 Computer
1020 Bus
1040 Processor
1060 Memory
1080 Storage device
1100 Input/output interface
1120 Network Interface
2000 Image management apparatus
2020 Acquisition unit
2040 Determination unit
2060 Update unit

What is claimed is:
1. An image management apparatus comprising:
   a memory storing instructions; and
   a processor configured to execute the instructions to:
   acquire a target image acquired by capturing an image of a target object;
   determine, from among master information including one or more master images, the master image having a degree of similarity to the target image equal to or more than a threshold value;
   compare a suitability of the target image as a master image and a suitability of the determined master image as the master image; and
   update the master information, based on a comparison result, wherein
   in updating the master information, when the suitability of the target image is higher than the suitability of the determined master image, the processor
      adds the target image to the master information as a master image, and
      deletes the determined master image from the master information or assigns to the target image a higher degree of priority than that assigned to the determined master image, and
   the master information is used for object recognition processing for recognizing an object included in an image, such that the one or more master images are preferentially used in the object recognition process in order of one or more degrees of priority respectively assigned to the one or more master images.
2. The image management apparatus according to claim 1, wherein
   in updating the master information, the processor determines that the suitability of the target image has the is higher than the suitability of the determined master image when a number of keypoints included in the target image is greater than a number of keypoints included in the determined master image, or when a resolution of the target image is higher than a resolution of the determined master image.

3. The image management apparatus according claim 1, wherein
in determining the master image, the processor
determines the master information indicating identification information of the target object, and
determines, from among the one or more master images included in the master information, the master image having the degree of similarity to the acquired target image equal to or more than the threshold value.

4. The image management apparatus according to claim 1, wherein
the processor computes the degree of similarity between the master image and the target image, based on a difference in position of same keypoints detected from the master image and the target image.

5. The image management apparatus according to claim 1, wherein
in updating the master information, the processor computes, for the target image, a suitability index value representing a height of suitability as a master image, and determines that, when the suitability index value of the target image is greater than a suitability index value of the master image, the suitability of the target image is higher than the suitability of the determined master image.

6. A control method executed by a computer and comprising:
acquiring a target image acquired by capturing an image of a target object;
determining, from among master information including one or more master images, the master image having a degree of similarity to the target image equal to or more than a threshold value;
comparing a suitability of the target image as a master image and a suitability of the determined master image as the master image; and
updating the master information, based on a comparison result, wherein
in updating the master information, when the target image has the higher suitability than the determined master image,
the target image is added to the master information as a master image, and
the determined master image is deleted from the master information, or a higher degree of priority is assigned to the target image than that assigned to the determined master image, and
the master information is used for object recognition processing for recognizing an object included in an image, such that the one or more master images are preferentially used in the object recognition process in order of one or more degrees of priority respectively assigned to the one or more master images.

7. The control method according to claim 6, wherein
in updating the master information, that the suitability of the target image is higher than the suitability of the determined master image when a number of keypoints included in the target image is greater than a number of keypoints included in the determined master image, or when a resolution of the target image is higher than a resolution of the determined master image.

8. The control method according to claim 6, wherein
in determining the master image,
the master information indicating identification information of the target object is determined; and
from among the master images included in the determined master information, the master image having the degree of similarity to the acquired target image equal to or more than the threshold value is determined.

9. The control method according to claim 6, further comprising,
in determining the master image, the degree of similarity between the master image and the target image is computed based on a difference in position of same keypoints detected from the master image and the target image.

10. The control method according to claim 6, further comprising,
in updating the master information, a suitability index value representing a height of suitability as a master image is computed for the target image, and when the suitability index value of the target image is greater than a suitability index value of the determined master image, the suitability of the target image is determined as being higher than the suitability of the determined master image.

11. A non-transitory storage medium storing a program causing a computer to execute a process comprising:
acquiring a target image acquired by capturing an image of a target object;
determining, from among master information including one or more master images, the master image having a degree of similarity to the target image equal to or more than a threshold value;
comparing a suitability of the target image as a master image and a suitability of the determined master image as the master image; and
updating the master information, based on a comparison result, wherein
in updating the master information, when the target image has the higher suitability than the determined master image,
the target image is added to the master information as a master image, and
the determined master image is deleted from the master information, or a higher degree of priority is assigned to the target image than that assigned to the determined master image, and
the master information is used for object recognition processing for recognizing an object included in an image, such that the one or more master images are preferentially used in the object recognition process in order of one or more degrees of priority respectively assigned to the one or more master images.

* * * * *